US012328604B2

(12) United States Patent
Thomas et al.

(10) Patent No.: US 12,328,604 B2
(45) Date of Patent: Jun. 10, 2025

(54) UTILIZING INVARIANT SHADOW FADING DATA FOR TRAINING A MACHINE LEARNING MODEL

(71) Applicant: VIAVI Solutions Inc., San Jose, CA (US)

(72) Inventors: Howard John Thomas, Stonehouse (GB); Christopher Michael Murphy, Bath (GB); Kexuan Sun, Stevenage (GB); Agustin Pozuelo, County Dublin (IE); Baruch Friedman, Dublin (IE); Takai Eddine Kennouche, Meylan (FR)

(73) Assignee: VIAVI Solutions Inc., Chandler, AZ (US)

( * ) Notice: Subject to any disclaimer, the term of this patent is extended or adjusted under 35 U.S.C. 154(b) by 580 days.

(21) Appl. No.: 17/656,635

(22) Filed: Mar. 25, 2022

(65) Prior Publication Data

US 2023/0308900 A1 Sep. 28, 2023

(51) Int. Cl.
*H04W 72/02* (2009.01)
*G06N 5/022* (2023.01)
(Continued)

(52) U.S. Cl.
CPC ............ *H04W 24/02* (2013.01); *G06N 5/022* (2013.01); *H04W 16/22* (2013.01); *H04W 24/08* (2013.01)

(58) Field of Classification Search
CPC ..... H04W 24/02; H04W 16/22; H04W 24/08; H04B 17/3911; G06N 5/022
(Continued)

(56) References Cited

U.S. PATENT DOCUMENTS 8,913,552 B2 * 12/2014 Agrawal ............ H04W 12/084
370/328
11,128,391 B1 9/2021 Aldossari et al.
(Continued)

FOREIGN PATENT DOCUMENTS

CN 112543471 A 3/2021

OTHER PUBLICATIONS

Kleinmeier et al., "Vadere: An open-source simulation framework to promote interdisciplinary understanding," Technical University of Munich, Department of Informatics, Jul. 16, 2019, 18 Pages.
(Continued)

*Primary Examiner* — Rownak Islam
(74) *Attorney, Agent, or Firm* — Harrity & Harrity, LLP

(57) ABSTRACT

A device may receive real mobile radio data identifying measurements of radio transmissions of base stations and user devices of a mobile radio environment in a geographical area, and may receive network topology data associated with the geographical area. The device may utilize, based on the network topology data, a machine learning feature extraction approach to generate a representation of invariant aspects of spatiotemporal predictable components of the real mobile radio data, and may generate, based on the representation of invariant aspects, stochastic data that includes a probability that a radio signal will be obstructed. The device may utilize the stochastic data to identify a realistic discoverable spatiotemporal signature, and may train or evaluate a system to manage performance of a mobile radio network based on the realistic discoverable spatiotemporal signature.

20 Claims, 11 Drawing Sheets

(51) Int. Cl.
*H04W 16/22* (2009.01)
*H04W 24/02* (2009.01)
*H04W 24/08* (2009.01)

(58) Field of Classification Search
USPC .......................................................... 370/252
See application file for complete search history.

(56) References Cited

U.S. PATENT DOCUMENTS

| | | | | |
|---|---|---|---|---|
| 2006/0104253 | A1* | 5/2006 | Douglas | H04W 24/02 |
| | | | | 370/338 |
| 2013/0100878 | A1* | 4/2013 | Chen | H04W 52/0245 |
| | | | | 370/315 |
| 2016/0099770 | A1* | 4/2016 | Glottmann | H04B 7/18532 |
| | | | | 370/316 |
| 2020/0343985 | A1 | 10/2020 | O'Shea et al. | |
| 2021/0256407 | A1* | 8/2021 | Therani | G06F 16/29 |
| 2023/0180002 | A1* | 6/2023 | Hwang | H04L 63/062 |
| | | | | 726/6 |

OTHER PUBLICATIONS

Aldossari, S., et al., "Predicting the Path Loss of Wireless Channel Models Using Machine Learning Techniques in MmWave Urban Communications," International Symposium on Wireless Personal Multimedia Communications, Nov. 24, 2019, pp. 1-6.

Extended European Search Report for Application No. EP23163872. 7, mailed Aug. 28, 2023, 19 Pages.

Glazunov, A.A., et al., "Decorrelation Distance Characterization of Long Term Fading of Cw Mimo Channels in Urban Multicell Environment," International Conference on Applied Electromagnetics and Communications, Jan. 1, 2005, pp. 1-4.

Patzold, M., et al., "Design of Measurement-based Correlation Models for Shadow Fading," International Conference on International Conference on Advanced Technologies for Communications, Oct. 20, 2010, pp. 112-117.

* cited by examiner

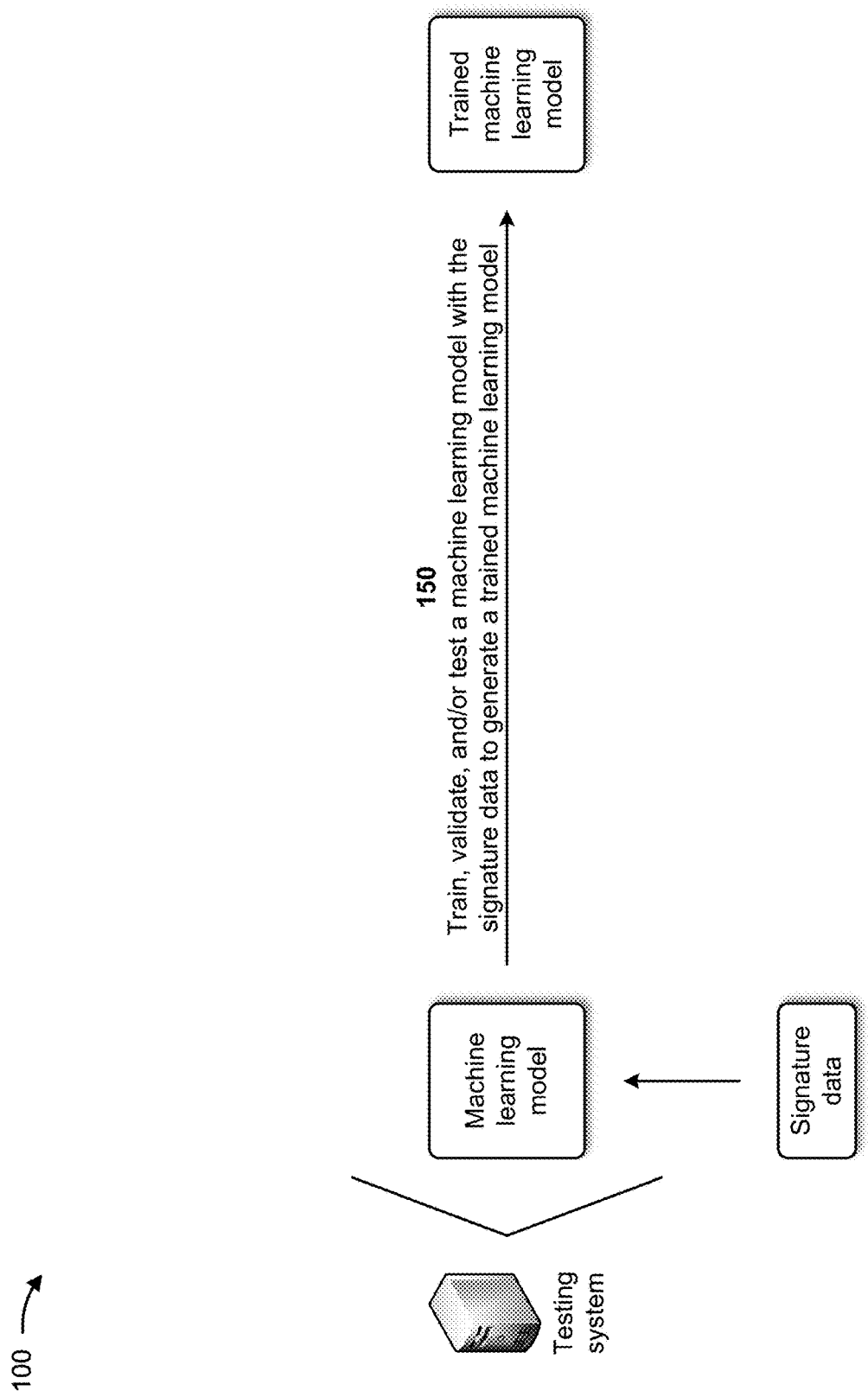

UTILIZING INVARIANT SHADOW FADING DATA FOR TRAINING A MACHINE LEARNING MODEL

BACKGROUND

Historically, simulated radio test data has been used to estimate radio system performance (e.g., performance of a cellular network, such as a fifth-generation (5G) network). The radio test data may be simulated via current simulation techniques, such as a ray-tracing simulation technique or a simplified simulation technique.

SUMMARY

Some implementations described herein relate to a method. The method may include receiving real mobile radio data identifying measurements of radio transmissions of base stations and user devices of a mobile radio environment in a geographical area, and receiving network topology data associated with the geographical area. The method may include utilizing, based on the network topology data, a machine learning feature extraction approach to generate a representation of invariant aspects of spatiotemporal predictable components of the real mobile radio data, and generating, based on the representation of invariant aspects, stochastic data that includes a probability that a radio signal will be obstructed. The method may include utilizing the stochastic data to identify a realistic discoverable spatiotemporal signature, and training or evaluating a system to manage performance of a mobile radio network based on the realistic discoverable spatiotemporal signature.

Some implementations described herein relate to a device. The device may include one or more memories and one or more processors coupled to the one or more memories. The one or more processors may be configured to receive real mobile radio data identifying measurements of radio transmissions of base stations and user devices of a mobile radio environment in a geographical area, and receive network topology data associated with the geographical area. The one or more processors may be configured to utilize, based on the network topology data, a machine learning feature extraction approach to generate a representation of invariant aspects of spatiotemporal predictable components of the real mobile radio data, generate, based on the representation of invariant aspects, stochastic data that includes a probability that a radio signal will be obstructed. The one or more processors may be configured to utilize the stochastic data to identify a realistic discoverable spatiotemporal signature, and train or evaluate a system to manage performance of a mobile radio network based on the realistic discoverable spatiotemporal signature.

Some implementations described herein relate to a non-transitory computer-readable medium that stores a set of instructions for a device. The set of instructions, when executed by one or more processors of the device, may cause the device to receive real mobile radio data identifying measurements of radio transmissions of base stations and user devices of a mobile radio environment in a geographical area, and receive network topology data associated with the geographical area. The set of instructions, when executed by one or more processors of the device, may cause the device to utilize, based on the network topology data, a machine learning feature extraction approach to generate a representation of invariant aspects of spatiotemporal predictable components of the real mobile radio data, and generate, based on the representation of invariant aspects, stochastic data that includes a probability that a radio signal will be obstructed. The set of instructions, when executed by one or more processors of the device, may cause the device to utilize the stochastic data to identify a realistic discoverable spatiotemporal signature, and train or evaluate a system to manage performance of a mobile radio network based on the realistic discoverable spatiotemporal signature.

BRIEF DESCRIPTION OF THE DRAWINGS

FIGS. 1A-1H are diagrams of an example implementation described herein.

DETAILED DESCRIPTION

Figure 1A:
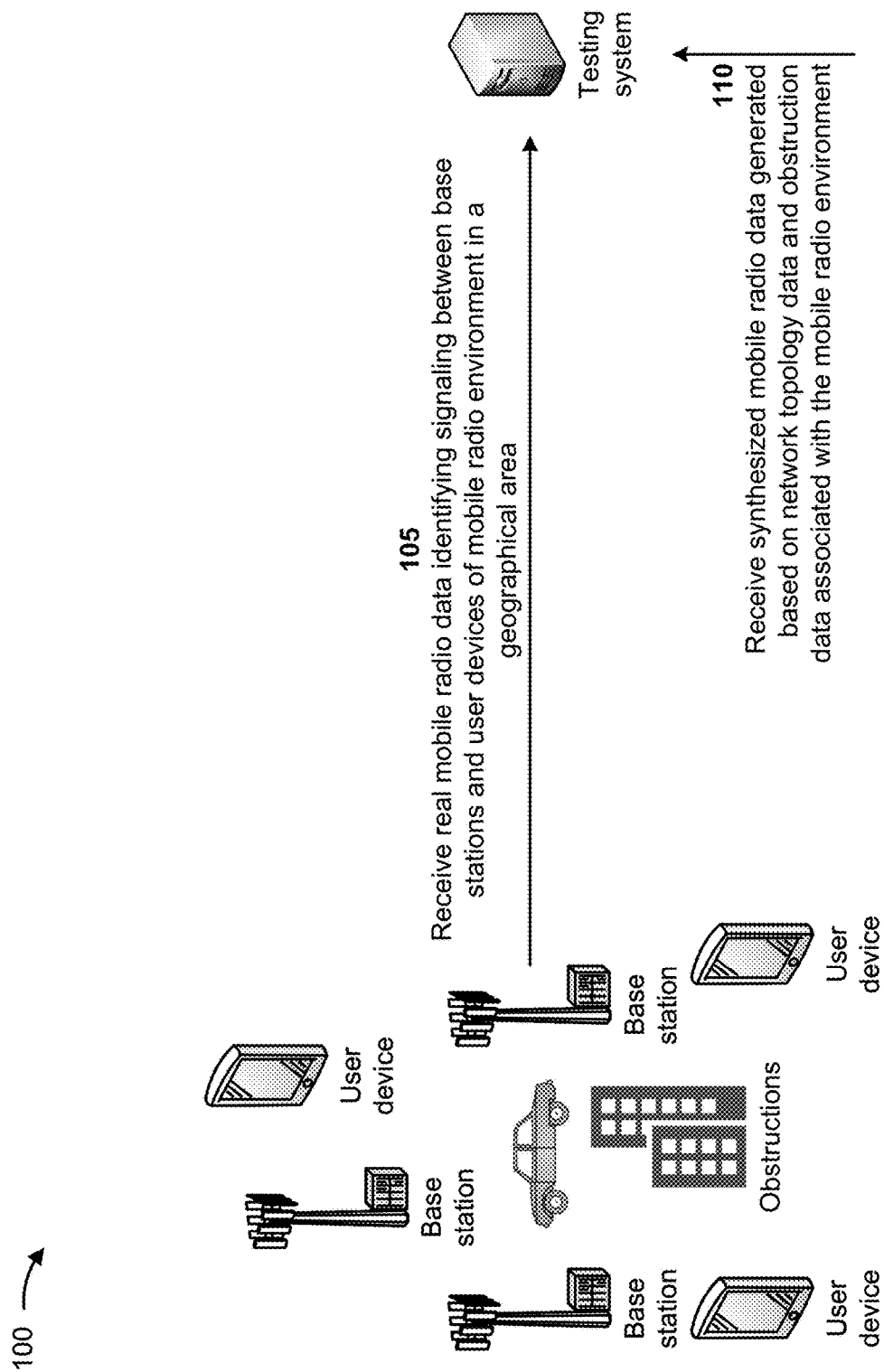

The following detailed description of example implementations refers to the accompanying drawings. The same reference numbers in different drawings may identify the same or similar elements.

A ray-tracing simulation technique may exhaustively and explicitly model known static obstructions (e.g., buildings, trees, and other scattering objects) in a mobile radio environment. Such obstructions may cause shadow fading in the mobile radio environment. Shadow fading is a large-scale fluctuation of a signal envelope due to large (e.g., with respect to a wavelength) objects obstructing propagation paths between a transmitter (e.g., a base station) and a receiver (e.g., a user device). However, ray-tracing simulation techniques are very computationally intensive and unsuited to generate results for real time testing and/or training a model for operation within a mobile radio environment. Moreover, three-dimensional (3D) models of the mobile radio environment, obstructions, and/or the like, required to perform such ray-tracing, are not generally available or may be outdated or incomplete. For example, typical 3D models do not generally address the internal structure and spaces of buildings, nor do they classify the reflective and transmissive properties of the building materials. Further, the 3D models do not address obstructions that are transitory in nature, such as vehicles, people, meteorological conditions, movement of tree branches and seasonal variation in vegetation, and/or the like. A first simplified simulation technique may include many simplifications, such as assuming that propagation loss experienced by mobile user devices is uncorrelated with location and/or time. However, with the first simplified simulation technique, a mobile user device will experience uncorrelated fading. A second simplified simulation technique may include many simplifications, such as assuming that propagation loss experienced by mobile user devices follows a free space propagation model. However, with the second simplified simulation technique, a mobile user device will experience neither correlated nor uncorrelated fading.

A radio access network (RAN) may include one or more optimization components for managing the operation of the RAN, improving the performance of network components, mitigating the impact of transient/inherent impairments, improving the quality of the service consumed by the users of the RAN, and/or the like. Such optimization components may be collocated with any of the network components, such as a base station, a radio unit, a distributed unit, a central unit, a RAN intelligent controller (RIC), an edge compute device, and/or the like. Alternatively, such optimization components may be implemented separately from any of the components of the RAN. The optimization components determine specific characteristics of the radio environment in which they operate and exploit these characteristics to achieve goals. In order to learn about the specific characteristics of the radio environment, the optimization components may employ machine learning models, evolutionary models, explicitly programmed models, and/or the like.

Thus, ray-tracing simulation techniques, while they are able to generate simulated radio test data that includes an element of shadow fading that is spatially invariant (e.g., fixed or permanent), are not suitable for real time testing of a mobile radio environment due to computational complexity, lack of availability of accurate and up to date 3D models of the mobile radio environment and absence of information about transitory obstructions. On the other hand, simplified simulation techniques fail to generate simulated radio test data that includes an element of shadow fading that is spatially invariant (e.g., fixed or permanent) suitable for real time testing of a mobile radio environment. Without such simulated radio test data, an optimization component is unable to learn about and exploit shadow fading in realistic radio test data. Furthermore, without such simulated radio test data, a testing system may be unable to evaluate a performance of an optimization component. Additionally, the lack of such simulated radio test data makes testing difficult for a system that uses received radio parameters to estimate subscriber geo-location.

Therefore, current techniques for generating simulated radio test data consume computing resources (e.g., processing resources, memory resources, communication resources, and/or the like), networking resources, and/or the like associated with utilizing computationally intensive ray-tracing simulation techniques, incorrectly evaluate the performance of optimization components of a RAN, incorrectly train optimization components of a RAN, incorrectly making incorrect modifications to the base station based on the incorrectly identified obstructions, discovering and correcting the incorrect modifications to the base station, and/or the like.

Some implementations described herein relate to a testing system that utilizes invariant shadow fading data for training a machine learning model. For example, the testing system may receive real mobile radio data identifying measurements of radio transmissions of base stations and user devices of a mobile radio environment in a geographical area, and may receive network topology data associated with the geographical area. The testing system may utilize, based on the network topology data, a machine learning feature extraction approach to generate a representation of invariant aspects of spatiotemporal predictable components of the real mobile radio data, and may generate, based on the representation of invariant aspects, stochastic data that includes a probability that a radio signal will be obstructed. The testing system may utilize the stochastic data to identify a realistic discoverable spatiotemporal signature, and may train or evaluate a system to manage performance of a mobile radio network based on the realistic discoverable spatiotemporal signature.

In this way, the testing system utilizes invariant shadow fading data for training a machine learning model. The testing system may determine characteristics of a composite waveform by analyzing mobile radio data since effects of temporal obstructions may be determined. The composite waveform need not provide an exact match for a real environment, but may reproduce time invariant properties of a slow fading component and statistically valid properties for other components of the fading. The testing system may generate multiple composite waveforms with the same invariant slow fading component but with independent obstruction-based fading and fast fading, which may enable determination of an ability of an optimization component to detect and make use of the invariant slow fading component. This, in turn, conserves computing resources, networking resources, and/or the like that would otherwise have been consumed in utilizing computationally intensive ray-tracing simulation techniques, incorrectly identifying fading features associated with a base station that includes an RIC and a machine learning model, incorrectly making incorrect modifications to the base station based on the incorrectly identified fading features, discovering and correcting the incorrect modifications to the base station, and/or the like.

FIGS. 1A-1H are diagrams of an example 100 associated with utilizing invariant shadow fading data for training a machine learning model. As shown in FIGS. 1A-1H, example 100 includes a mobile radio environment associated with a testing system. The mobile radio environment may include multiple base stations communicating with multiple user devices. One or more invariant (e.g., fixed or non-temporal) obstructions (e.g., buildings, trees, and/or the like) and/or one or more variant (e.g., temporal) obstructions (e.g., vehicles, people, and/or the like) may also be associated with the mobile radio environment. Further details of the base stations, the user devices, the obstructions, and the testing system are provided elsewhere herein.

As shown in FIG. 1A, and by reference number 105, the testing system may receive real mobile radio data identifying signaling between the base stations and the user devices of the mobile radio environment in a geographical area. For example, the testing system may periodically receive the real mobile radio data from the base stations and the user devices over a time period, may continuously receive the real mobile radio data from the base stations and the user devices over a time period, and/or the like. Each of the base stations may communicate with one or more user devices via signaling. Since each of the base stations is a transceiver, the signaling may include wireless (e.g., radio frequency (RF)) signals transmitted by the base station to the one or more user devices, wireless (e.g., RF) signals received by the base station from the one or more user devices, and/or the like. The signaling may enable each of the base stations to communicate with the one or more user devices and provide services (e.g., telecommunications services, connections to other networks, and/or the like) to the one or more user devices. A strength of a signal between a base station and a user device may depend on a proximity of the base station and the user device, signal power output of the base station, signal power output of the user device, a quantity of obstructions provided between the base station and the user device, types of obstructions provided between the base station and the user device, and/or the like.

In some implementations, the real mobile radio data may include measurements or key performance indicators (KPIs) associated with the signaling provided between the base stations and the user devices of the mobile radio environment in the geographical area (e.g., over a time period). The measurements may include events (e.g., connections, traffic transmission, traffic reception, and/or the like) recorded by performance counters associated with the base stations and/ or the user devices. The KPIs may be calculated based on the measurements (e.g., the recorded events). The KPIs may include bandwidths, throughputs, signal strengths, availability indicators (e.g., percentages of time that the base stations are providing services to the user devices), network resource indicators (e.g., traffic and control channels provided by the base stations), handover indicators (e.g., a handover of a moving user device from one base station to another base station), voice service indicators, data service indicators, and/or the like. In some implementations, the testing system may receive the measurements and/or the signaling from the base stations and/or the user devices, and may calculate the KPIs based on the measurements and/or the signaling.

As further shown in FIG. 1A, and by reference number 110, the testing system may receive synthesized mobile radio data generated based on network topology data and obstruction data associated with the mobile radio environment. For example, the testing system may receive the synthesized mobile radio data from third party data sources (e.g., map data sources, building data sources, transportation data sources, telecommunication providers, and/or the like) that maintain information associated with the geographical area and the mobile radio environment. The synthesized mobile radio data may be generated based on the network topology data and the obstruction data. The network topology data may include data identifying locations of the base stations in the mobile radio environment, a quantity of antennas provided on each of the base stations, characteristics of the antennas of the base stations, and/or the like.

The obstruction data may include data identifying locations and characteristics of obstructions provided within the geographical area. The obstructions data may include map data identifying streets, buildings, sidewalks, highways, street poles, traffic signs, statues, trees, and/or the like provided within the geographical area. The map data may identify the invariant (e.g., fixed or non-temporal) obstructions provided within the geographical area. The obstruction data may include data identifying characteristics of the obstructions, such as building footprints and heights, street widths and lengths, sidewalk widths and lengths, street pole footprints and heights, tree footprints and heights, materials utilized in the buildings, materials utilized in the streets, and/or the like. In some implementations, the obstruction data may identify variant (e.g., temporal) obstructions (e.g., vehicles, people, and/or the like) provided within the geographical area. Such information may be obtained from historical traffic data identifying historical vehicle traffic patterns during the time period (e.g., one hour, one day, and/or the like), historical quantities of vehicles during the time period, historical pedestrian traffic patterns during the time period, historical quantities of pedestrians during the time period, and/or the like. Although temporal, such obstructions may still obstruct and affect signaling between the base stations and the user devices.

Figure 1B:
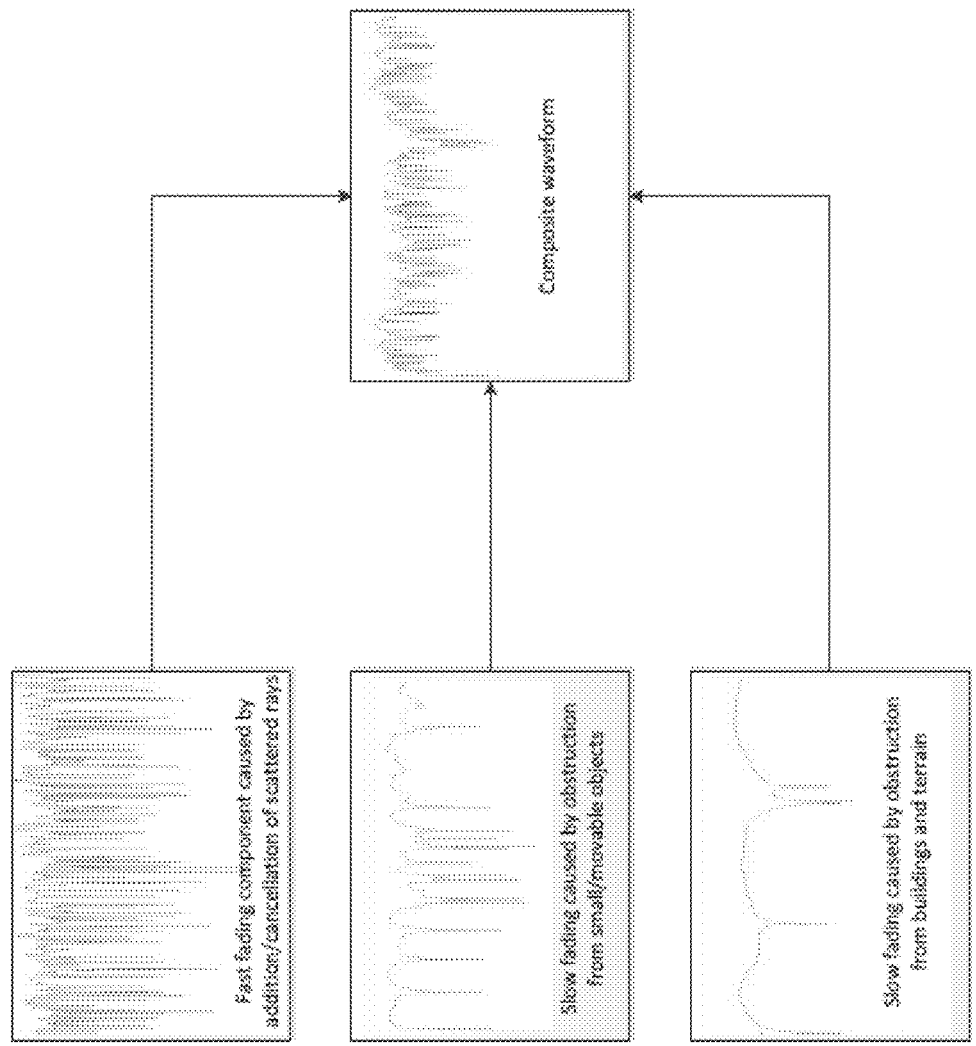

FIG. 1B depicts an example composite waveform with characteristics that are representative of the mobile radio environment (e.g., the real mobile radio data). As shown, the composite waveform may include a slow fading component caused by permanent obstructions (e.g., buildings and terrain), a slow fading component caused by temporal obstructions (e.g., small and or movable objects), and a fast fading component caused by the addition and/or cancellation of scattered rays arriving at a base station antenna. Shadow fading is a large-scale fluctuation of a signal due to large (e.g., with respect to a wavelength) objects obstructing propagation paths between transmitter (e.g., a base station) and a receiver (e.g., a user device).

The slow fading component generated by permanent obstructions is invariant since, at a particular location, an effect of the slow fading component will be the same for any user device and at any time. Principal factors that determine the slow fading component include obstruction of a line of sight path between a base station and a user device, obstruction of reflected paths, a need to diffract around or penetrate through obstructions, and/or the like. Consequently, the testing system may identify the slow fading component and, notwithstanding noise caused by the other components, predict within bounds of uncertainty, other parameters based on identification of the slow fading component. For example, identification of the slow fading component may enable the testing system to calculate a geolocation of a user device, predict a future performance of an optimization component, and/or the like.

If a detailed map of the mobile radio environment is available, the testing system may utilize a ray-tracing process to determine a reasonable estimate of the slow fading component and the fast fading component if a sufficiently detailed three-dimensional map is available for the mobile radio environment. The ray-tracing process may be computationally expensive and may be limited by the availability of suitable three-dimensional maps. The ray-tracing process also fails to address the effects of temporal obstructions caused by small and or mobile objects, as such objects are not represented on maps.

In some implementations, the testing system may determine characteristics of the composite waveform by analyzing of the real mobile radio data since the effects of the temporal obstructions may be determined. If the composite waveform is to be used for testing purposes, the composite waveform need not provide an exact match for a real environment, but may reproduce time invariant properties of the slow fading component and statistically valid properties for the other components of the fading. The testing system may generate multiple composite waveforms with the same invariant slow fading component but with independent obstruction-based fading and fast fading, which may enable determination of an ability of an optimization component to detect and make use of the invariant slow fading component.

If the composite waveform is to be used in an optimization component (e.g., of base station) to exploit a potentially discoverable invariant slow fading component of a real-time signal, then the optimization component may determine the composite waveform from real waveforms and based on the invariant slow fading built up over time. The optimization component may determine statistical properties of random components of the real-time signal so that what if scenarios may be determined using the invariant slow fading component and statistical bounds of the other components.

Figure 1C:
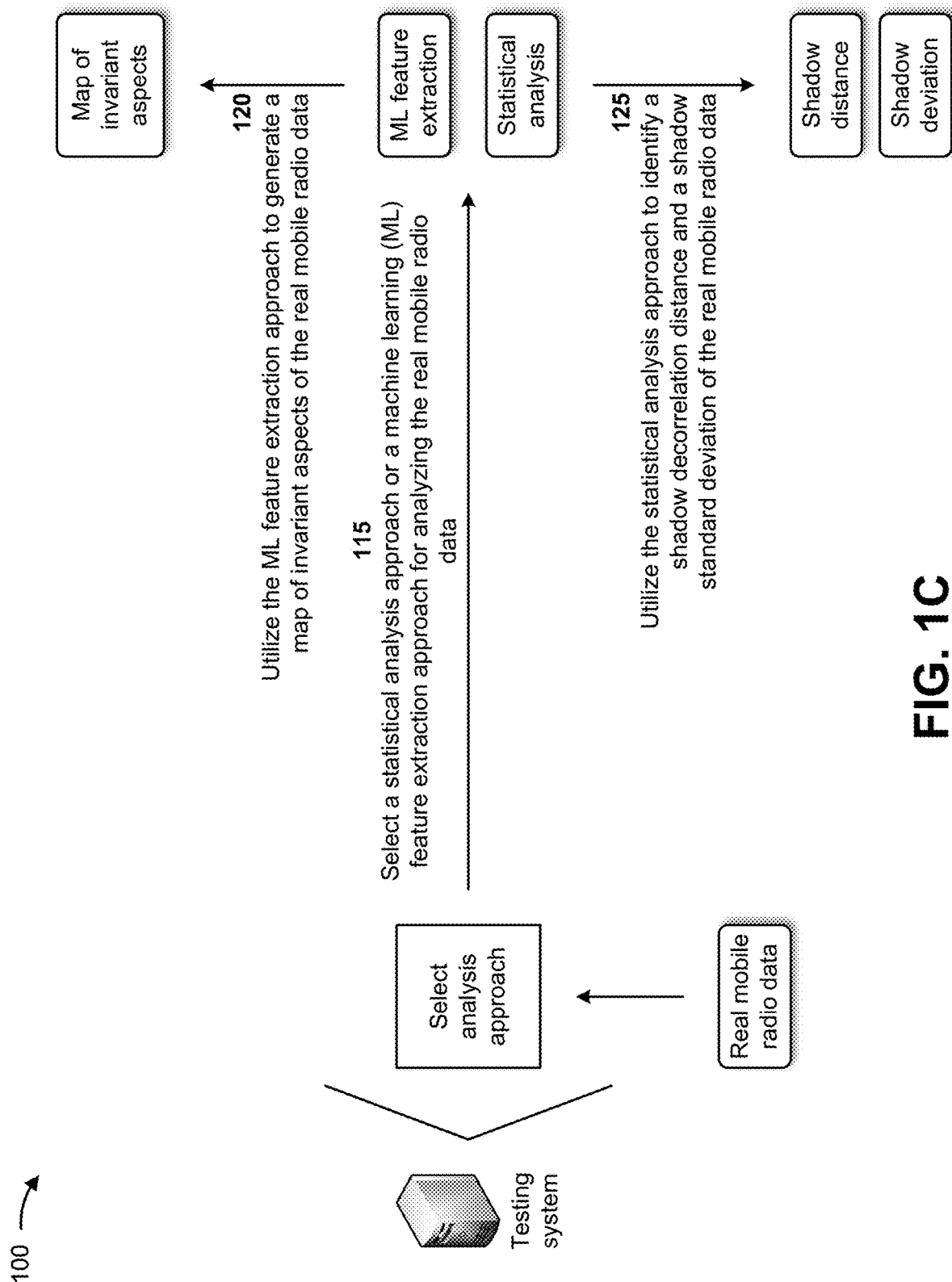

As shown in FIG. 1C, and by reference number 115, the testing system may select a statistical analysis approach or a machine learning (ML) feature extraction approach for analyzing the real mobile radio data. For example, the testing system may select the statistical analysis approach when the real mobile radio data is not to be analyzed in real time. The testing system may select the machine learning feature extraction approach when the real mobile radio data is to be analyzed in real time. In some implementations, the testing system may utilize both the statistical analysis approach and the machine learning feature extraction approach for analyzing the real mobile radio data.

As further shown in FIG. 1C, and by reference number 120, the testing system may utilize the machine learning feature extraction approach to generate a map of invariant aspects of the real mobile radio data. For example, the testing system may utilize the machine learning feature extraction approach to generate the map of invariant aspects in near-real time. The invariant aspects of the real mobile radio data may assist the testing system in prediction of quality of service (QoS), quality of experience (QoE), locations, trajectories, and/or the like associated with the user devices. In some implementations, the testing system may identify, in the real mobile radio data, shadow fading data caused by obstructions in the mobile radio environment. For example, the testing system may analyze the real mobile radio data for fluctuations, and may compare the fluctuations to a threshold value indicative of shadow fading. If a signal of the real mobile radio data includes a fluctuation that satisfies the threshold value, the testing system may determine that the fluctuation is shadow fading data. If a signal of the real mobile radio data includes a fluctuation that fails to satisfy the threshold value, the testing system may determine that the fluctuation is not shadow fading data. In some implementations, the testing system may add the shadow fading data to the map of invariant aspects of the real mobile radio data.

As further shown in FIG. 1C, and by reference number 125, the testing system may utilize the statistical analysis approach to identify a shadow decorrelation distance and a shadow standard deviation of the real mobile radio data. For example, a predetermined spatially correlated shadow fading map may represent shadow fading, between each base station and potential locations of a user device in the mobile environment, as a scalar value with a correlation between adjacent points following an exponentially decaying autocorrelation value with a shadow decorrelation distance representing a characteristic of the mobile radio environment (e.g., a street width, a building height, a building footprint, a tree, a moving car, and/or the like). Since the shadow fading may be captured at an appropriate level of spatial granularity to a shadow decorrelation distance, the testing system may determine intermediate values by interpolation. The shadow standard deviation may indicate whether the mobile radio environment is an urban environment, a suburban environment, a rural environment, and/or the like.

Figure 1D:
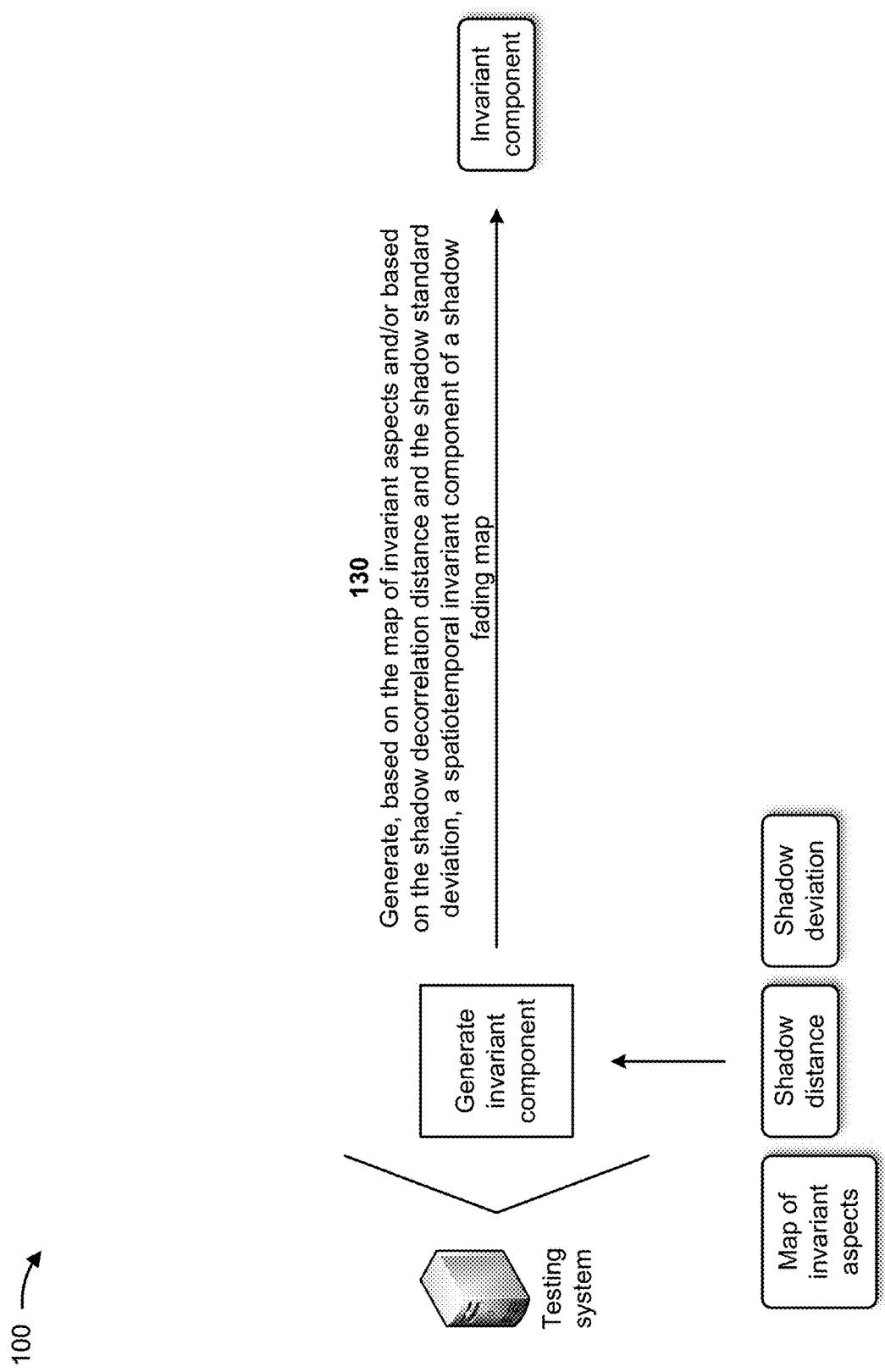

As shown in FIG. 1D, and by reference number 130, the testing system may generate, based on the map of invariant aspects and/or based on the shadow decorrelation distance and the shadow standard deviation, a spatiotemporal invariant component of a shadow fading map. For example, each of the base stations may be associated with multiple shadow fading maps since each base station may provide transmissions on different frequency bands and with multiple antenna directivity patterns and the signaling may experience shadow fading from multiple obstructions in a coverage area of each base station. A shadow fading map may represent shadow fading, between each base station and a potential user device location, as a scalar value with a correlation between adjacent points following an exponentially decaying autocorrelation value with a decorrelation distance representing a characteristic of the mobile radio environment (e.g., a street width, a building height, a building footprint, a tree, a moving car, and/or the like). Since the shadow fading may be captured at an appropriate level of spatial granularity to an assumed spatial decorrelation distance, the testing system may determine intermediate values by interpolation. In some implementations, the shadow fading map may represent a vector quantity, such that shadow fading may vary with an incident angle at a user device and/or a base station. In some implementations, the shadow fading map may include a spatiotemporal invariant component that is invariant with time and captures alterations to the radio mobile radio data caused by the stationary obstructions (e.g., buildings, light poles, trees, and/or the like) provided within the geographical location.

The testing system may utilize parameters to characterize the spatiotemporal invariant component of the shadow fading map. The parameters may be statistically generated from the shadow decorrelation distance, the shadow standard deviation, and a standard seed; may synthesized from a ray trace; may be extracted from the real mobile radio data; and/or the like. In some implementations, the testing system may generate one or more synthetic shadow fading maps, such as one or more Gaussian shadow fading maps generated based on the shadow decorrelation distance, the shadow standard deviation. Alternatively, or additionally, the testing system may generate one or more real shadow fading maps based on analysis of the real mobile radio data. Alternatively, or additionally, the testing system may generate one or more shadow fading maps based on analysis of real mobile data from a first geographic area. The one or more maps may have one or more adjustment applied through scaling, rotation, translation, duplication, tessellation, subjecting to one or more geometric transformation function, subjecting to one or more randomizing function, subjecting to one or more blurring function, and/or the like. The one or more maps and/or one or more adjustments may use, as inputs, values of shadow standard deviation and shadow fading decorrelation distance that characterize a second geographic area, a simulated area, a morphology (dense urban, urban, suburban, rural, and/or the like), a representative area, and/or the like. Such values are, for example, published by 3GPP for some representative environments or may be collected, estimated, simulated, inferred, and/or the like.

Figure 1E:
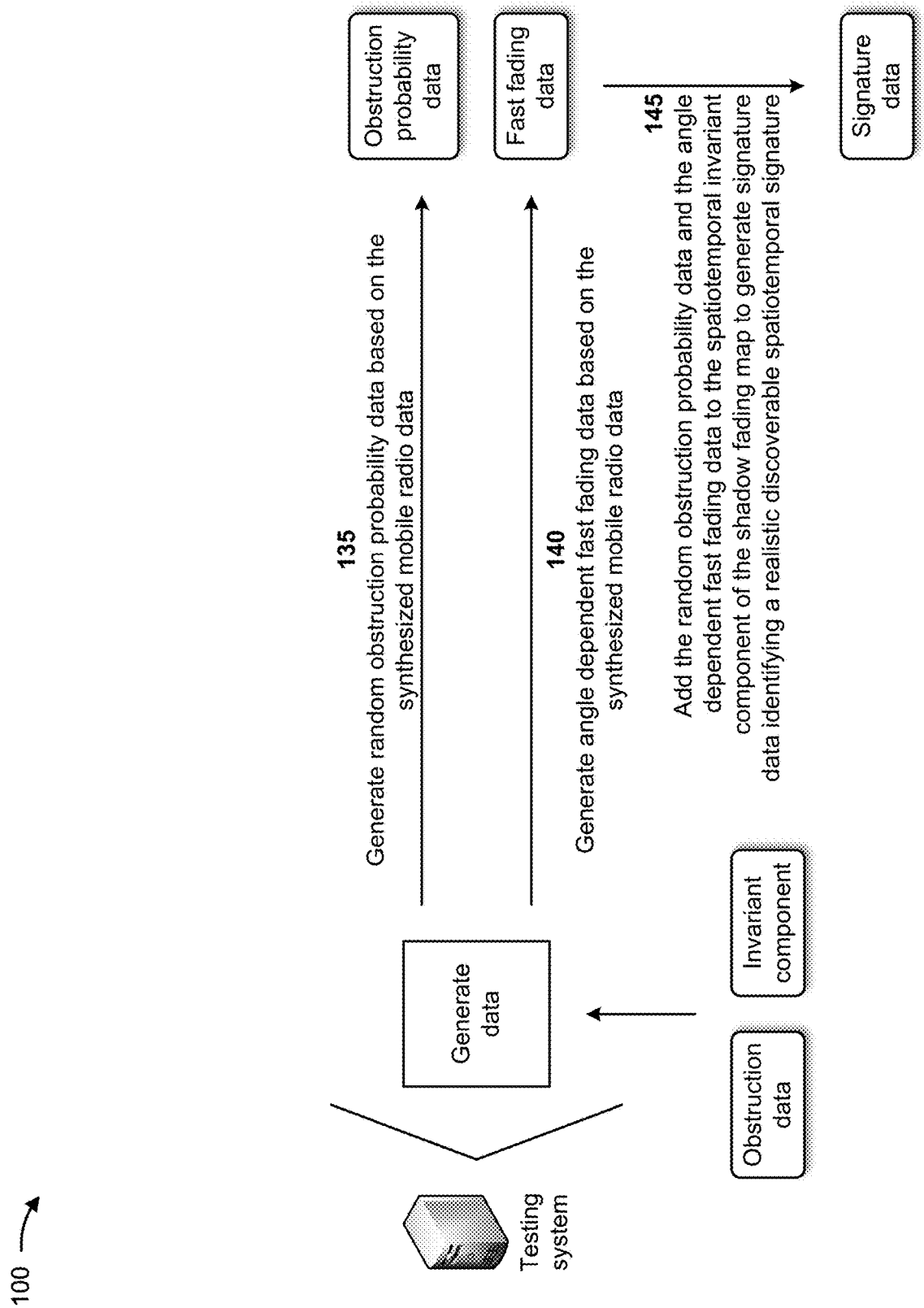

As shown in FIG. 1E, and by reference number 135, the testing system may generate random obstruction probability data based on the synthesized mobile radio data. For example, the testing system may select random obstruction probability data, from the synthesized mobile radio data, based on a similarity of the synthesized mobile radio data with known factors about the geographical location. The similarity may be determined based on characteristics of the geographical location (e.g., the shadow decorrelation distance, the shadow standard deviation, and/or the like), types of obstructions (e.g., train station, road intersection, and/or the like) in the geographical location, pattern matching with historical geographical locations, and/or the like. In some implementations, the testing system may generate multiple random obstruction probability data sets based on the synthesized mobile radio data.

As further shown in FIG. 1E, and by reference number 140, the testing system may generate angle dependent fast fading data based on the synthesized mobile radio data. For example, the testing system may generate the angle dependent fast fading data based on various scattered signals included in the synthesized mobile radio data. The testing system may generate the angle dependent fast fading data using one or more statistical models. In some implementations, the testing system may generate multiple angle dependent fast fading data sets based on the synthesized mobile radio data.

As further shown in FIG. 1E, and by reference number 145, the testing system may add the random obstruction probability data and the angle dependent fast fading data to the spatiotemporal invariant component of the shadow fading map to generate signature data identifying a realistic discoverable spatiotemporal signature. For example, the testing system may generate multiple composite waveforms (e.g., multiple signatures) with the same invariant slow fading component (e.g., the spatiotemporal invariant component of the shadow fading map) but with independent obstruction-based fading (e.g., the random obstruction probability data) and fast fading (e.g., the angle dependent fast fading data), which may enable determination of an ability of an optimization component to detect and make use of the invariant slow fading component.

As shown in FIG. 1F, and by reference number 150, the testing system may train, validate, and/or test the machine learning model with the signature data to generate a trained machine learning model. For example, the testing system may divide the signature data into a first portion of signature data, a second portion of signature data, and a third portion of signature data. The first portion, the second portion, and the third portion may include a same quantity of the signature data, different quantities of the signature data, and/or the like. In some implementations, more of the signature data may be allotted to the first portion of signature data since the first portion may be utilized to generate the training data set for the machine learning model.

The testing system may generate a training dataset for the machine learning model based on the first portion of signature data. The testing system may generate a validation dataset for the machine learning model based on the second portion of signature data. The testing system may generate a test dataset for the machine learning model based on the third portion of signature data. In other implementations, the testing system may utilize different portions of the signature data to generate the training dataset, the validation dataset, and/or the test dataset for the machine learning model.

The testing system may train the machine learning model with the training dataset to generate the trained machine learning model. As described elsewhere herein, the machine learning model may be trained to process real time mobile radio data associated with a base station, and identify one or more shadow fading features in a coverage area of the base station. In some implementations, rather than training the machine learning model, the testing system may obtain the trained machine learning model from another system or device that trained the machine learning model. In this case, the testing system may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the machine learning model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space, and/or the like.

In some implementations, the testing system may train the machine learning model with the training dataset to generate the trained machine learning model, and may process the validation dataset, with the trained machine learning model, to validate that the trained machine learning model is operating correctly. If the trained machine learning model is operating correctly, the testing system may process the trained machine learning model, with the test dataset, to further ensure that the trained machine learning model is operating correctly. A trained machine learning model can be said to be operating correctly if it has adequate accuracy, has adequate precision, has adequate recall, is not subject to excessive overfitting, and/or the like. If the trained machine learning model is operating excessively incorrect, the testing system may modify the trained machine learning model and may revalidate and/or retest the modified machine learning model based on the validation dataset and/or the test dataset.

Figure 1G:
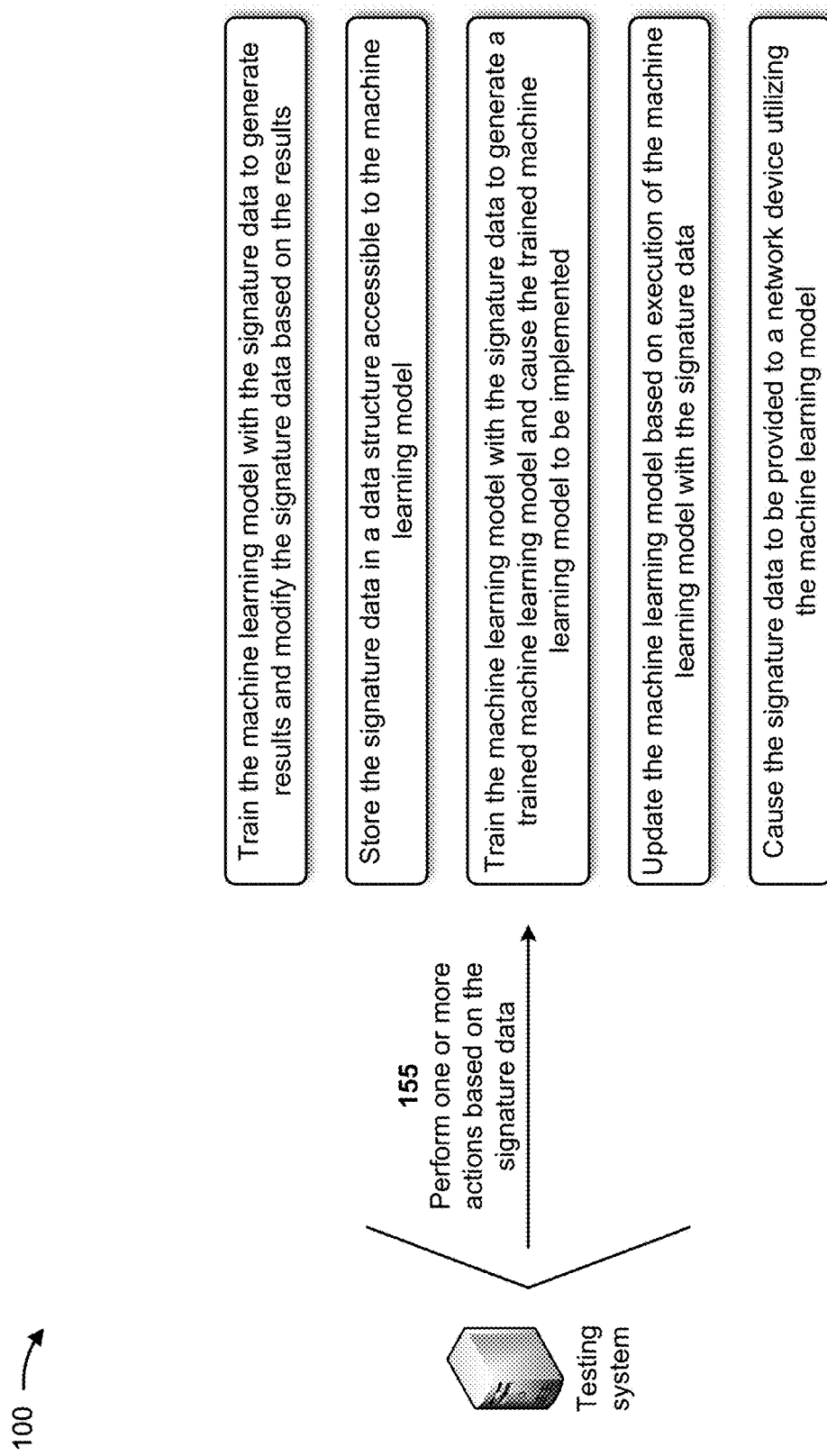

As shown in FIG. 1G, and by reference number 155, the testing system may perform one or more actions based on the signature data. In some implementations, performing the one or more actions includes the testing system training the machine model with the signature data to generate results and modifying the signature data based on the results. For example, the testing system may train the machine learning model with the signature data, and the machine learning model may produce predictions (e.g., results) based on training the machine learning model. The testing system may utilize the predictions to modify and improve the signature data. In this way, the testing system conserves computing resources, networking resources, and/or the like that would otherwise have been consumed in utilizing the computationally intensive ray-tracing simulation technique, incorrectly identifying fading features associated with a base station that includes the machine learning model, making incorrect modifications to the base station based on the incorrectly identified fading features, discovering and correcting the incorrect modifications to the base station, and/or the like.

In some implementations, performing the one or more actions includes the testing system storing the signature data in a data structure accessible to the machine learning model. For example, the testing system may store the signature data in a data structure so that the machine learning model (e.g., provided in a base station) may access and utilize the signature data to train, validate, and/or test the machine learning model. In this way, the testing system conserves computing resources, networking resources, and/or the like that would otherwise have been consumed in incorrectly identifying fading features associated with a base station that includes the machine learning model, incorrectly making incorrect modifications to the base station based on the incorrectly identified fading features, and/or the like.

In some implementations, performing the one or more actions includes the testing system training the machine learning model with the signature data to generate a trained machine learning model and causing the trained machine learning model to be implemented. For example, the testing system may train the machine learning model with the signature data and may cause a base station to implement the trained machine learning model with real time mobile radio data. The base station may process the real time mobile radio data, with the trained machine learning model, to make predictions associated with obstructions provided within a coverage area of the base station. In this way, the testing system conserves computing resources, networking resources, and/or the like that would otherwise have been consumed in utilizing the computationally intensive ray-tracing simulation technique, incorrectly identifying fading features associated with the base station that includes the machine learning model, and/or the like.

In some implementations, performing the one or more actions includes the testing system updating the machine learning model based on execution of the machine learning model with the signature data. For example, the testing system may process the signature data with the machine learning model to generate predictions. The testing system may determine that the predictions are incorrect and may modify or update the machine learning model based on the incorrect predictions. In this way, the testing system conserves computing resources, networking resources, and/or the like that would otherwise have been consumed in incorrectly making incorrect modifications to the base station based on incorrectly identified fading features, discovering and correcting the incorrect modifications to the base station, and/or the like.

In some implementations, performing the one or more actions includes the testing system causing the signature data to be provided to a network device utilizing the machine learning model. For example, the testing system may provide the signature data to a base station utilizing the machine learning model. The base station may train the machine learning model, with the signature data, to generate the trained machine learning model. The base station may process real time mobile radio data, with the trained machine learning model, to make predictions associated with obstructions provided within a coverage area of the base station. In this way, the testing system conserves computing resources, networking resources, and/or the like that would otherwise have been consumed in utilizing the computationally intensive ray-tracing simulation technique, incorrectly identifying fading features associated with the base station that includes the machine learning model, and/or the like.

Figure 1H:
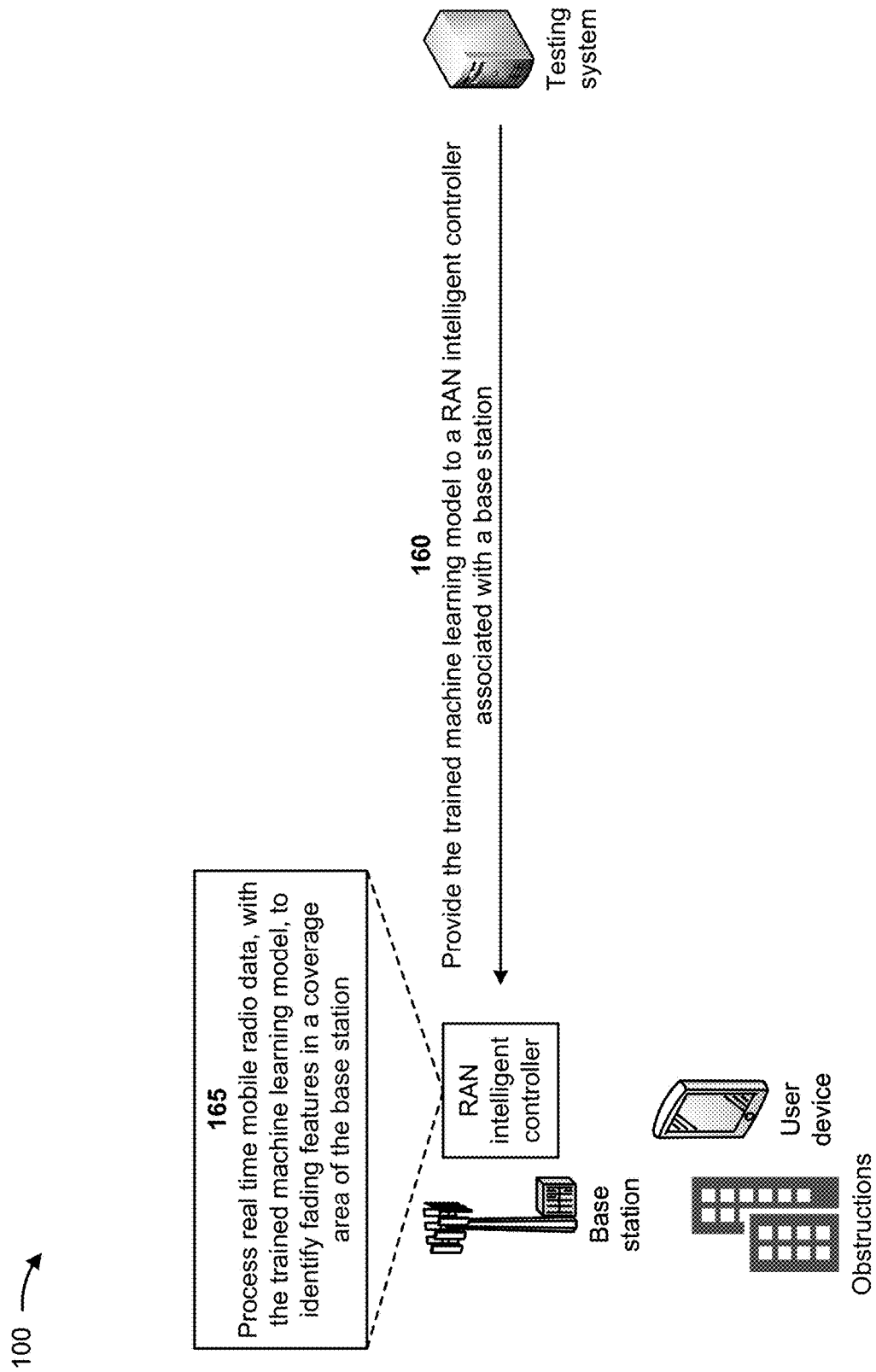

As shown in FIG. 1H, and by reference number 160, the testing system may provide the trained machine learning model to a RAN intelligent controller associated with a base station. For example, the testing system may provide the trained machine learning model to a network device (e.g., a base station) associated with real time mobile radio data. The base station may include a RAN intelligent controller that receives and stores the trained machine learning model. In some implementations, the machine learning model may be stored in the RAN intelligent controller, and the testing system may provide the signature data to the RAN intelligent controller. In such implementations, the RAN intelligent controller may train the machine learning model, with the signature data, to generate the trained machine learning model.

As further shown in FIG. 1H, and by reference number 165, the RAN intelligent controller may process real time mobile radio data, with the trained machine learning model, to identify fading features in a coverage area of the base station. For example, the base station may provide a coverage area for a geographical location that includes obstructions. The base station may receive real time mobile radio data from the coverage area and may provide the real time mobile radio data to the RAN intelligent controller. The RAN intelligent controller may process the real time mobile radio data, with the trained machine learning model, to identify the fading features in the coverage area of the base station.

The trained machine learning model may enable the RAN intelligent controller to create a simulation space that includes discoverable signatures representative of the obstructions in the coverage area. The RAN intelligent controller may utilize the discoverable signatures to process the real time mobile radio data (e.g., measurement and/or KPI data) and to identify the obstructions. The trained machine learning model may process the real time mobile radio data and may detect signatures in the real time mobile radio data that are representative of location dependent modifications to received signals (e.g., shadow fading caused by obstructions). The RAN intelligent controller may utilize the identified fading features to detect locations of user devices more accurately and/or to determine performance enhancements and/or optimizations for the base station.

For example, the RAN intelligent controller may utilize measurements of signal quality and performance KPIs, associated with the base station and including the shadow fading caused by obstructions, to improve signal quality generated by the base station by modifying settings for transmission power, base station antenna tilt, change of serving cell, change of serving frequency band layer, handover and reselection parameters, allocation and retention parameters, pilot power/reference signal levels and associated offsets, admission control parameters, allocation of resources and priority to one or more slices, and/or the like. In this way, the RAN intelligent controller may estimate impacts of machine learning model-identified fading features on performance of the base station, and may generate recommendations to improve performance of the base station.

In some implementations, the testing system may aid in a design and development of the machine learning model (e.g., an application, such as an xApp, an rApp, and/or the like), in a performance evaluation of the machine learning model, in a determination of an expected impact on system performance of a recommendation provided by the machine learning model, and/or the like. The trained machine learning model may enable an accurate estimate of a location of a user device to be determined by the RAN intelligent controller, which may improve system performance for the user device (e.g., compared to a user device location estimate derived simply from an average signal strength).

In this way, the testing system utilizes invariant shadow fading data for training a machine learning model. The testing system may determine characteristics of a composite waveform by analyzing mobile radio data since effects of temporal obstructions may be determined. The composite waveform need not provide an exact match for a real environment, but may reproduce time invariant properties of a slow fading component and statistically valid properties for other components of the fading. The testing system may generate multiple composite waveforms with the same invariant slow fading component but with independent obstruction-based fading and fast fading, which may enable determination of an ability of an optimization component to detect and make use of the invariant slow fading component. This, in turn, conserves computing resources, networking resources, and/or the like that would otherwise have been consumed in utilizing computationally intensive ray-tracing simulation techniques, incorrectly identifying fading features associated with a base station that includes an RIC and a machine learning model, incorrectly making incorrect modifications to the base station based on the incorrectly identified fading features, discovering and correcting the incorrect modifications to the base station, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
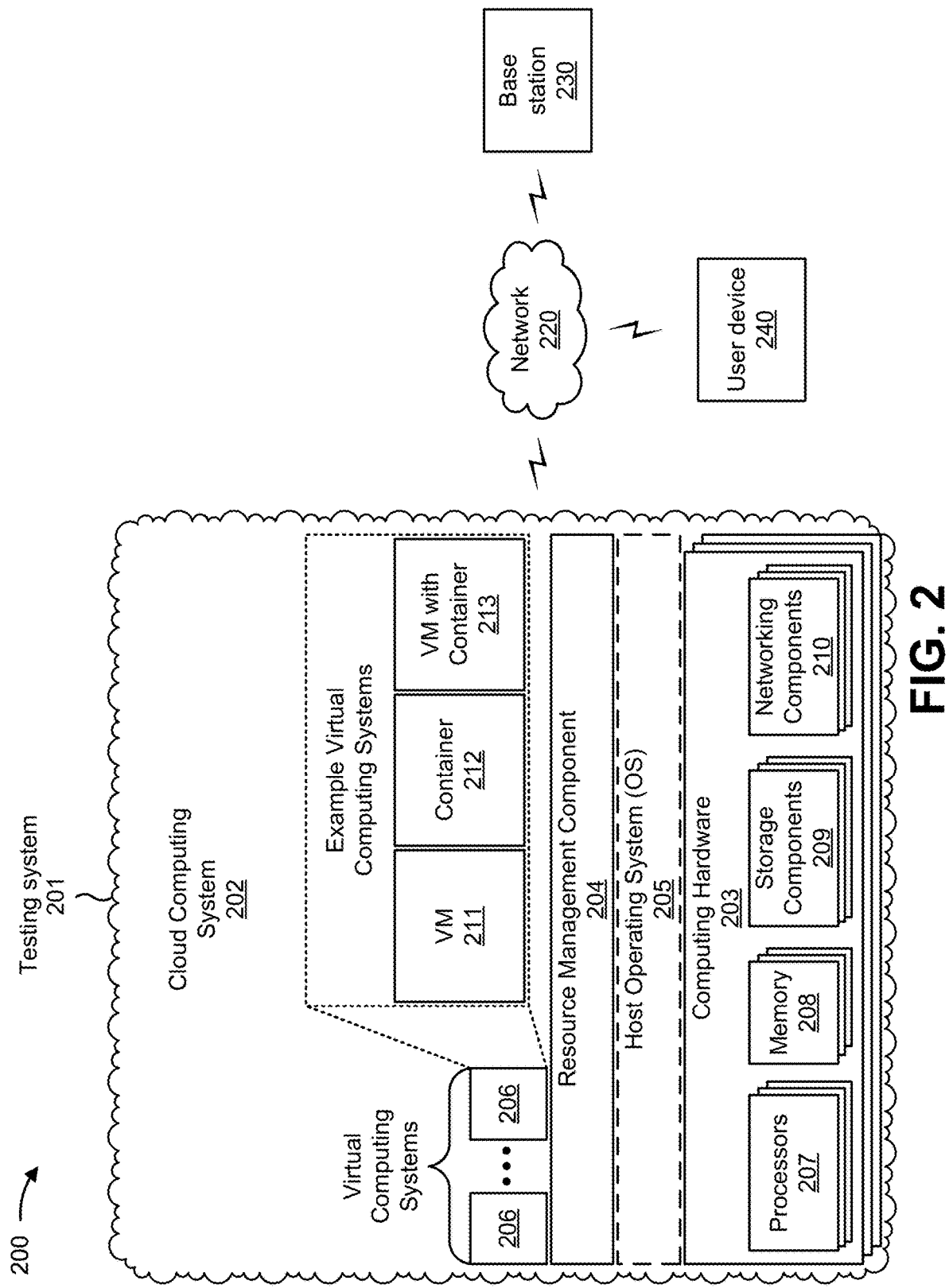
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a testing system 201, which may include one or more elements of and/or may execute within a cloud computing system 202. The cloud computing system 202 may include one or more elements 203-213, as described in more detail below. As further shown in FIG. 2, the environment 200 may include a network 220, a base station 230, and/or a user device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the testing system 201 may include one or more elements 203-213 of the cloud computing system 202, may execute within the cloud computing system 202, and/or may be hosted within the cloud computing system 202, in some implementations, the testing system 201 may not be cloud-based (e.g., may be implemented outside of a cloud computing system) or may be partially cloud-based. For example, the testing system 201 may include one or more devices that are not part of the cloud computing system 202, such as a device 300 of FIG. 3, which may include a standalone server or another type of computing device. The testing system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The base station 230 may support, for example, a cellular radio access technology (RAT). The base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 240. The base station 230 may transfer traffic between the user device 240 (e.g., using a cellular RAT), one or more base stations (e.g., using a wireless interface or a backhaul interface, such as a wired backhaul interface), and/or a core network. The base station 230 may provide one or more cells that cover geographic areas.

The user device 240 includes one or more devices capable of receiving, generating, storing, processing, and/or providing information, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
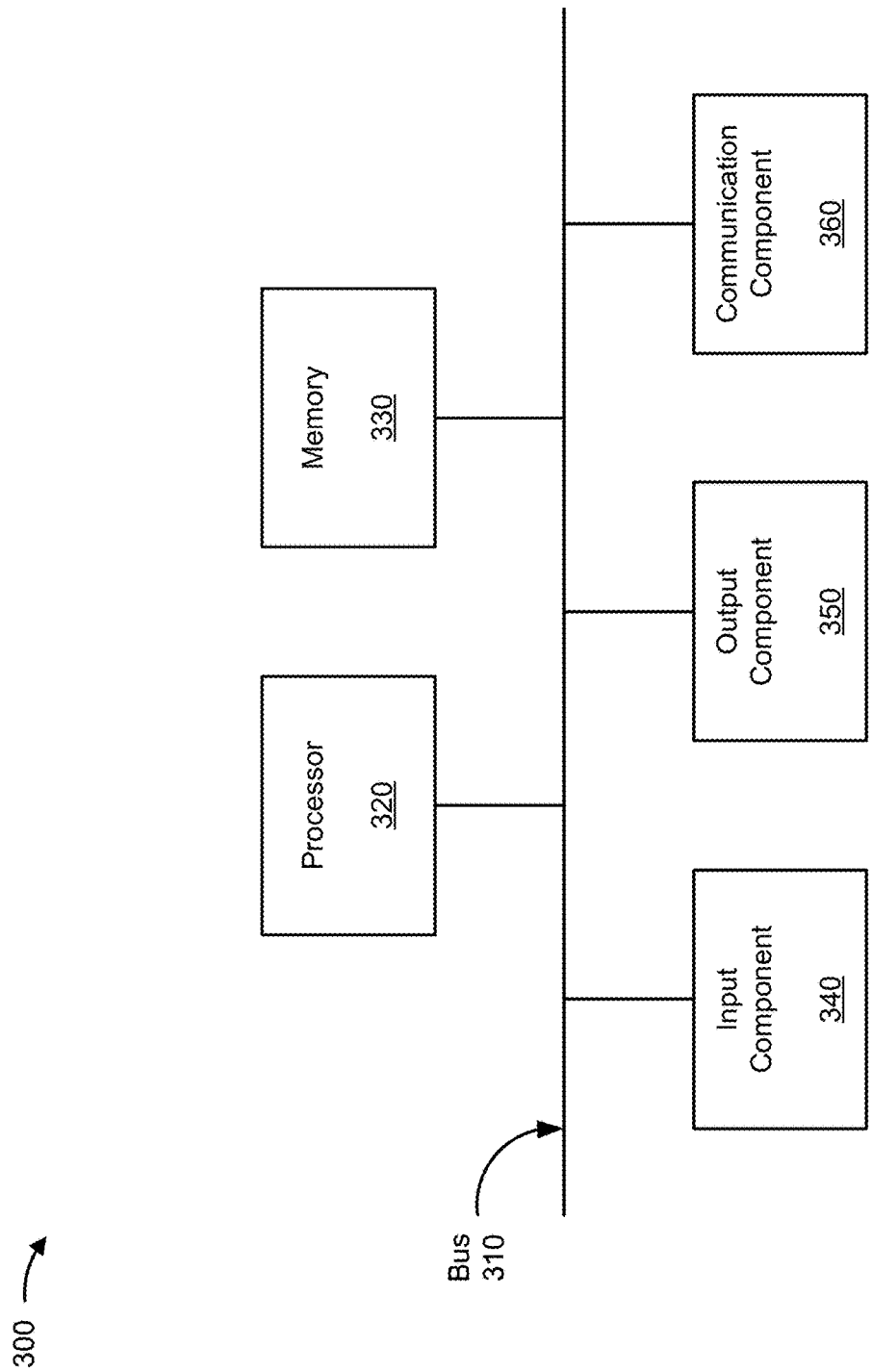
FIG. 3 is a diagram of example components of one or more devices of FIG. 2.

FIG. 3 is a diagram of example components of a device 300, which may correspond to the testing system 201, the base station 230, and/or the user device 240. In some implementations, the testing system 201, the base station 230, and/or the user device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
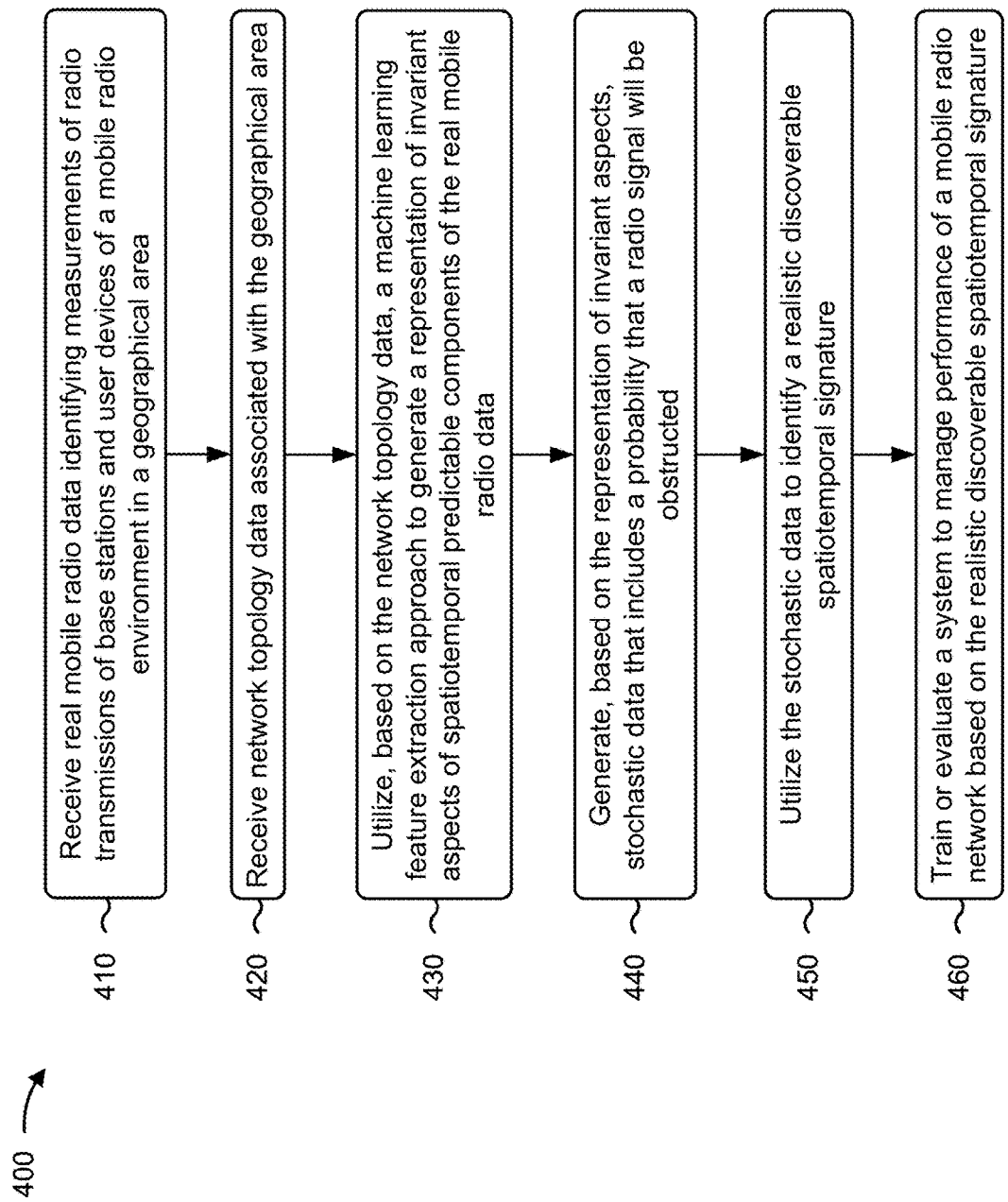
FIG. 4 is a flowchart of an example process for utilizing invariant shadow fading data for training a machine learning model.

FIG. 4 is a flowchart of an example process 400 for utilizing invariant shadow fading data for training a machine learning model. In some implementations, one or more process blocks of FIG. 4 may be performed by a device (e.g., the testing system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving real mobile radio data identifying measurements of radio transmissions of base stations and user devices of a mobile radio environment in a geographical area (block 410). For example, the device may receive real mobile radio data identifying measurements of radio transmissions of base stations and user devices of a mobile radio environment in a geographical area, as described above. In some implementations, the real mobile radio data includes a composite waveform with a slow fading component caused by permanent obstructions, a slow fading component caused by temporal obstructions, and a fast fading component.

As further shown in FIG. 4, process 400 may include receiving network topology data associated with the geographical area (block 420). For example, the device may receive network topology data associated with the geographical area, as described above. In some implementations, the network topology data includes obstruction data identifying permanent obstructions in the geographical area and temporal obstructions in the geographical area.

As further shown in FIG. 4, process 400 may include utilizing, based on the network topology data, a machine learning feature extraction approach to generate a representation of invariant aspects of spatiotemporal predictable components of the real mobile radio data (block 430). For example, the device may utilize, based on the network topology data, a machine learning feature extraction approach to generate a representation of invariant aspects of spatiotemporal predictable components of the real mobile radio data, as described above.

As further shown in FIG. 4, process 400 may include generating, based on the representation of invariant aspects, stochastic data that includes a probability that a radio signal will be obstructed (block 440). For example, the device may generate, based on the representation of invariant aspects, stochastic data that includes a probability that a radio signal will be obstructed, as described above.

As further shown in FIG. 4, process 400 may include utilizing the stochastic data to identify a realistic discoverable spatiotemporal signature (block 450). For example, the device may utilize the stochastic data to identify a realistic discoverable spatiotemporal signature, as described above.

As further shown in FIG. 4, process 400 may include training or evaluating a system to manage performance of a mobile radio network based on the realistic discoverable spatiotemporal signature (block 460). For example, the device may train or evaluating a system to manage performance of a mobile radio network based on the realistic discoverable spatiotemporal signature, as described above.

In some implementations, process 400 includes utilizing a statistical analysis approach to identify a shadow decorrelation distance and a shadow standard deviation relating to another geographical area, wherein utilizing the machine learning feature extraction approach to generate the representation of invariant aspects includes generating another representation of invariant aspects based on the shadow decorrelation distance and the shadow standard deviation relating to the other geographical area, and wherein the representation of the invariant aspects of spatiotemporal predictable components of the real mobile radio data of the geographical area is used as an input to the machine learning feature extraction approach.

In some implementations, process 400 includes generating a validation dataset for the system based on the realistic discoverable spatiotemporal signature, and validating the system with the validation dataset. In some implementations, process 400 includes generating a test dataset for the system based on the realistic discoverable spatiotemporal signature, and testing the system with the test dataset.

In some implementations, process 400 includes training a machine learning model with the realistic discoverable spatiotemporal signature to generate a trained machine learning model, and causing the trained machine learning model to be implemented by an element collocated with any of the network device associated with the mobile radio environment, wherein the element is configured to utilize the trained machine learning model to identify shadow fading features in a coverage area of the network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, real mobile radio data identifying measurements of radio transmissions of base stations and user devices of a mobile radio environment in a geographical area;
    receiving, by the device, network topology data associated with the geographical area;
    utilizing, by the device and based on the network topology data, a machine learning feature extraction approach to generate a representation of invariant aspects of spatiotemporal predictable components of the real mobile radio data;
    generating, by the device and based on the representation of invariant aspects, stochastic data that includes a probability that a radio signal will experience fading;
    utilizing, by the device, the stochastic data to identify a realistic discoverable spatiotemporal signature;

training or evaluating, by the device, a system to manage performance of a mobile radio network based on the realistic discoverable spatiotemporal signature;
generating a validation dataset for the system based on the realistic discoverable spatiotemporal signature; and
validating the system with the validation dataset.

2. The method of claim 1, further comprising:
utilizing a statistical analysis approach to identify a shadow decorrelation distance and a shadow standard deviation of the real mobile radio data,
wherein utilizing the machine learning feature extraction approach to generate the representation of invariant aspects includes:
generating the representation of invariant aspects based on the shadow decorrelation distance and the shadow standard deviation of the real mobile radio data.

3. The method of claim 1, further comprising:
utilizing a statistical analysis approach to identify a shadow decorrelation distance and a shadow standard deviation relating to another geographical area,
wherein utilizing the machine learning feature extraction approach to generate the representation of invariant aspects includes:
generating another representation of invariant aspects based on the shadow decorrelation distance and the shadow standard deviation relating to the other geographical area,
wherein the other representation of the invariant aspects of spatiotemporal predictable components of the real mobile radio data of the geographical area is used as an input to the machine learning feature extraction approach.

4. The method of claim 1, further comprising:
generating a test dataset for the system based on the realistic discoverable spatiotemporal signature; and
testing the system with the test dataset.

5. The method of claim 1, further comprising:
training a machine learning model with the realistic discoverable spatiotemporal signature to generate a trained machine learning model; and
causing the trained machine learning model to be implemented by an element collocated with a network device associated with the mobile radio environment,
wherein the element is configured to utilize the trained machine learning model to identify shadow fading features in a coverage area of the network device.

6. The method of claim 1, wherein the real mobile radio data includes a composite waveform with a slow fading component caused by permanent obstructions, a slow fading component caused by temporal obstructions, and a fast fading component.

7. The method of claim 1, wherein the network topology data includes obstruction data identifying permanent obstructions in the geographical area and temporal obstructions in the geographical area.

8. A device, comprising:
one or more memories; and
one or more processors, coupled to the one or more memories, configured to:
receive real mobile radio data identifying measurements of radio transmissions of base stations and user devices of a mobile radio environment in a geographical area;
receive network topology data associated with the geographical area;
utilize, based on the network topology data, a machine learning feature extraction approach to generate a representation of invariant aspects of spatiotemporal predictable components of the real mobile radio data;
generate, based on the representation of invariant aspects, stochastic data that includes a probability that a radio signal will experience fading;
utilize the stochastic data to identify a realistic discoverable spatiotemporal signature;
train or evaluate a system to manage performance of a mobile radio network based on the realistic discoverable spatiotemporal signature;
generate a validation dataset for the system based on the realistic discoverable spatiotemporal signature; and
validate the system with the validation dataset.

9. The device of claim 8, wherein the one or more processors are further configured to:
utilize a statistical analysis approach to identify a shadow decorrelation distance and a shadow standard deviation relating to another geographical area; and
generate another representation of invariant aspects based on the shadow decorrelation distance and the shadow standard deviation relating to the other geographical area,
wherein the other representation of the invariant aspects of spatiotemporal predictable components of the real mobile radio data of the geographical area is used as an input to the machine learning feature extraction approach.

10. The device of claim 8, wherein the one or more processors are further configured to:
generate a test dataset for the system based on the realistic discoverable spatiotemporal signature; and
test the system with the test dataset.

11. The device of claim 8, wherein the one or more processors are further configured to:
train a machine learning model with the realistic discoverable spatiotemporal signature to generate a trained machine learning model; and
cause the trained machine learning model to be implemented by an element collocated with a network device associated with the mobile radio environment,
wherein the element is configured to utilize the trained machine learning model to identify shadow fading features in a coverage area of the network device.

12. The device of claim 8, wherein the real mobile radio data includes a composite waveform with a slow fading component caused by permanent obstructions, a slow fading component caused by temporal obstructions, and a fast fading component.

13. The device of claim 8, wherein the network topology data includes obstruction data identifying permanent obstructions in the geographical area and temporal obstructions in the geographical area.

14. The device of claim 8, wherein the one or more processors are further configured to:
utilize a statistical analysis approach to identify a shadow decorrelation distance and a shadow standard deviation of the real mobile radio data,
wherein the one or more processors, to generate the representation of invariant aspects, are configured to:
generate the representation of invariant aspects based on the shadow decorrelation distance and the shadow standard deviation of the real mobile radio data.

15. A non-transitory computer-readable medium storing a set of instructions, the set of instructions comprising:
one or more instructions that, when executed by one or more processors of a device, cause the device to:
receive real mobile radio data identifying measurements of radio transmissions of base stations and user devices of a mobile radio environment in a geographical area;
receive network topology data associated with the geographical area;
utilize, based on the network topology data, a machine learning feature extraction approach to generate a representation of invariant aspects of spatiotemporal predictable components of the real mobile radio data;
generate, based on the representation of invariant aspects, stochastic data that includes a probability that a radio signal will experience fading;
utilize the stochastic data to identify a realistic discoverable spatiotemporal signature;
train or evaluate a system to manage performance of a mobile radio network based on the realistic discoverable spatiotemporal signature;
generate a validation dataset for the system based on the realistic discoverable spatiotemporal signature; and
validate the system with the validation dataset.

16. The non-transitory computer-readable medium of claim 15, wherein the one or more instructions further cause the device to:
utilize a statistical analysis approach to identify a shadow decorrelation distance and a shadow standard deviation relating to another geographical area; and
generate another representation of invariant aspects based on the shadow decorrelation distance and the shadow standard deviation relating to the other geographical area,
wherein the other representation of the invariant aspects of spatiotemporal predictable components of the real mobile radio data of the geographical area is used as an input to the machine learning feature extraction approach.

17. The non-transitory computer-readable medium of claim 15, wherein the one or more instructions further cause the device to:
generate a test dataset for the system based on the realistic discoverable spatiotemporal signature; and
test the system with the test dataset.

18. The non-transitory computer-readable medium of claim 15, wherein the one or more instructions further cause the device to:
train a machine learning model with the realistic discoverable spatiotemporal signature to generate a trained machine learning model; and
cause the trained machine learning model to be implemented by an element collocated with a network device associated with the mobile radio environment,
wherein the element is configured to utilize the trained machine learning model to identify shadow fading features in a coverage area of the network device.

19. The non-transitory computer-readable medium of claim 15, wherein the real mobile radio data includes a composite waveform with a slow fading component caused by permanent obstructions, a slow fading component caused by temporal obstructions, and a fast fading component.

20. The non-transitory computer-readable medium of claim 15, wherein the one or more instructions further cause the device to:
utilize a statistical analysis approach to identify a shadow decorrelation distance and a shadow standard deviation of the real mobile radio data,
wherein the one or more instructions, that cause the device to generate the representation of invariant aspects, cause the device to:
generate the representation of invariant aspects based on the shadow decorrelation distance and the shadow standard deviation of the real mobile radio data.

* * * * *